(12) United States Patent
Waters

(10) Patent No.: US 7,036,740 B2
(45) Date of Patent: May 2, 2006

(54) LIGHT CARD

(76) Inventor: Michael Waters, 372 Bateman Cir. North, Barrington Hills, IL (US) 60010

( * ) Notice: Subject to any disclaimer, the term of this patent is extended or adjusted under 35 U.S.C. 154(b) by 0 days.

(21) Appl. No.: 10/946,592

(22) Filed: Sep. 21, 2004

(65) Prior Publication Data

US 2006/0060656 A1    Mar. 23, 2006

(51) Int. Cl.
*G06K 21/00* (2006.01)
(52) U.S. Cl. ............... 235/487; 235/492; 362/189; 362/200; 362/201; 362/240
(58) Field of Classification Search .......... 235/487, 235/492; 362/189, 200, 201, 240, 198
See application file for complete search history.

(56) References Cited

U.S. PATENT DOCUMENTS

| 5,412,199 | A |   | 5/1995  | Finkelstein et al. |          |
|-----------|---|---|---------|--------------------|----------|
| 5,434,405 | A |   | 7/1995  | Finkelstein et al. |          |
| 5,457,613 | A | * | 10/1995 | Vandenbelt et al.  | 362/200  |
| 5,608,203 | A |   | 3/1997  | Finkelstein et al. |          |
| 5,856,661 | A |   | 1/1999  | Finkelstein et al. |          |
| 6,070,990 | A | * | 6/2000  | Dalton et al.      | 362/201  |
| 6,176,430 | B1|   | 1/2001  | Finkelstein et al. |          |
| D444,060  | S |   | 6/2001  | Elsener, Sr.       |          |
| 6,302,570 | B1|   | 10/2001 | Petell et al.      |          |
| 6,347,875 | B1|   | 2/2002  | Painsith           |          |
| 6,390,372 | B1| * | 5/2002  | Waters             | 235/487  |
| 6,447,143 | B1|   | 9/2002  | Krietzman et al.   |          |
| 6,769,618 | B1|   | 8/2004  | Finkelstein        |          |
| 6,817,532 | B1|   | 11/2004 | Finkelstein        |          |
| 2002/0136606 | A1| * | 9/2002 | Altman          | 362/200  |
| 2003/0090898 | A1| * | 5/2003 | Goldstein et al.| 362/200  |
| 2003/0107884 | A1| * | 6/2003 | Krietzman et al.| 362/189  |
| 2003/0189829 | A1| * | 10/2003| Shimizu et al.  | 362/240  |
| 2003/0201331 | A1| * | 10/2003| Finkelstein     | 235/487  |
| 2003/0223224 | A1|   | 12/2003| Painsith         |          |

* cited by examiner

*Primary Examiner*—Karl D. Frech
*Assistant Examiner*—Allyson N Trail
(74) *Attorney, Agent, or Firm*—Fitch, Even, Tabin Flannery

(57) ABSTRACT

A light card is provided having a switch bar that avoids the need to bend an LED lead for turning the LED light on. The light card can be implemented in a credit or debit card size, with a viewing lens, or used as a key ring holder.

16 Claims, 5 Drawing Sheets

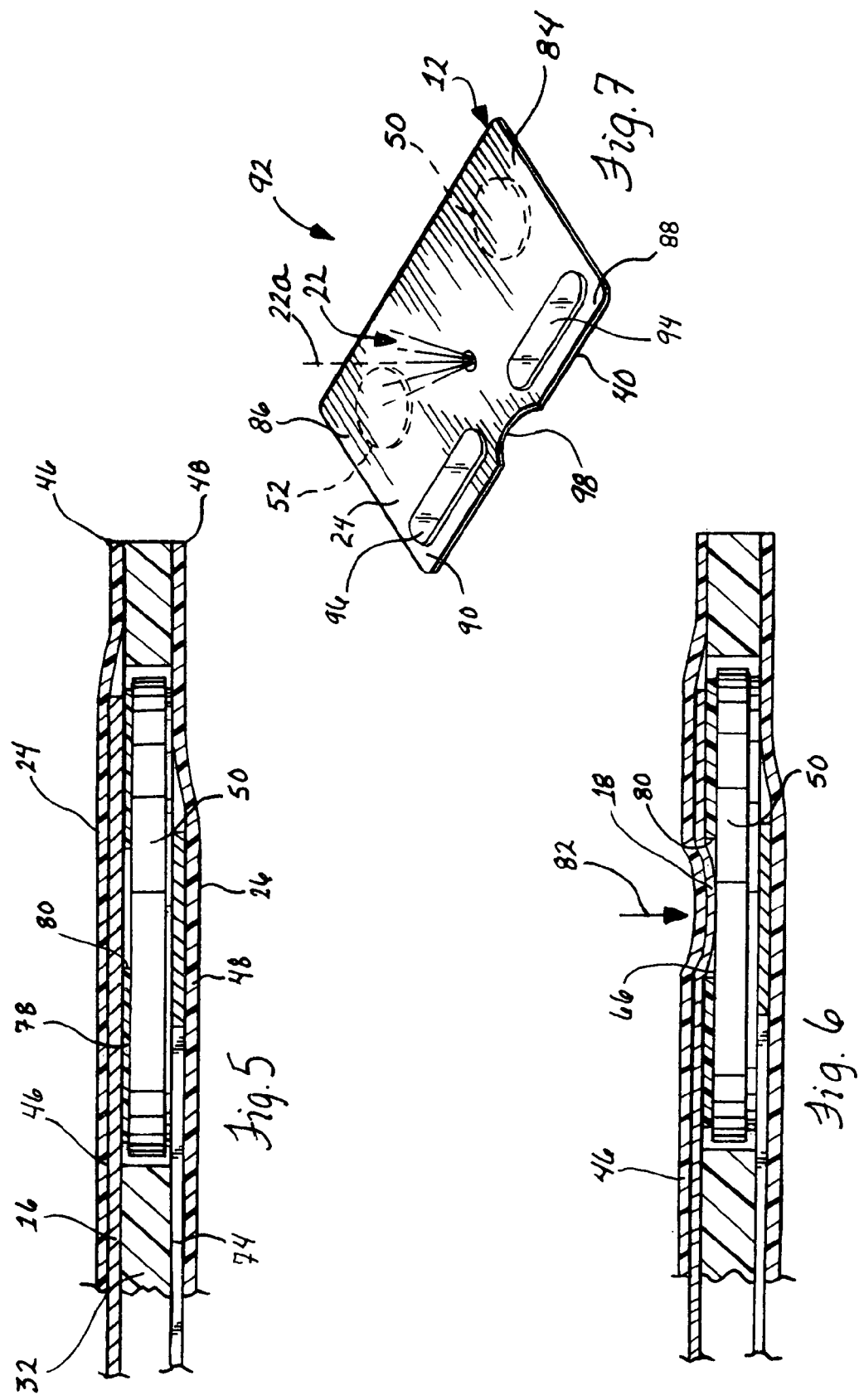

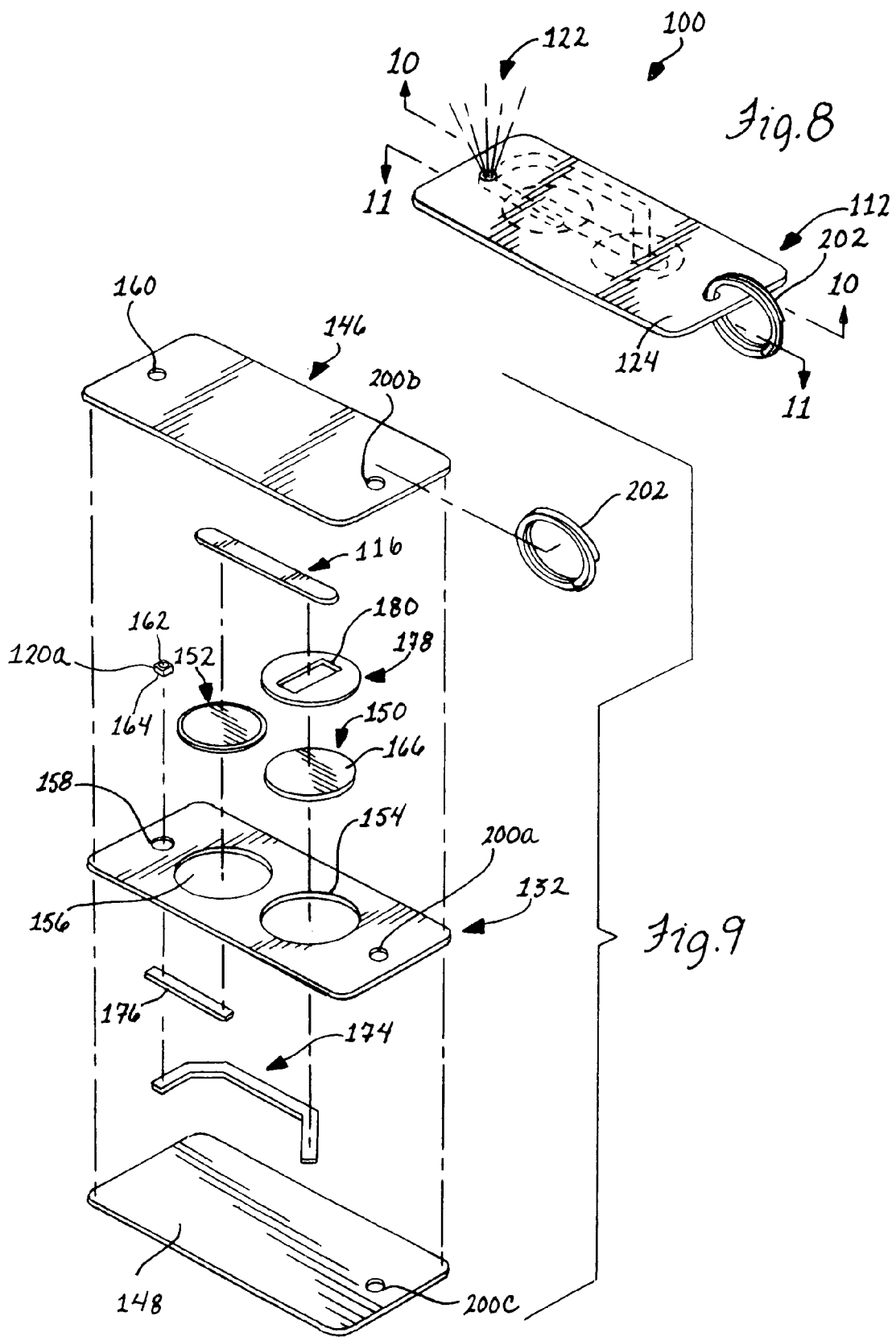

LIGHT CARD

FIELD OF THE INVENTION

The invention relates to lighting devices and, more particularly, to card members carrying lights thereon.

BACKGROUND OF THE INVENTION

Providing lights on thin card members advantageously provides compact and low profile lighting devices for users thereof. However, known light cards are generally deficient in the switching mechanisms utilized to selectively power the lights carried thereby. Generally, when employing LEDs that include elongate wire positive and negative leads extending therefrom, it is known that mechanical stress on the leads should be avoided. However, where such LEDs are employed with lighted cards, there are switching mechanisms thereof that have required that one of leads be bent each time the LED light is to be turned on (see U.S. Pat. No. 5,457,613 to Vandenbelt et al. and U.S. Pat. No. 6,070,990 to Dalton, et al.). In addition to the undue stress on the LED leads generated by the switching mechanisms taught by the '613 and '990 patents, the '990 patent also teaches a tray-type card body having a thinned wall area aligned with the LED lead to be bent. The thinning of this wall portion allows it to be flexible so that a user can push on the wall portion and bend both it and the LED lead. As is apparent, both of these features are undesirable for the switching function in which they are implemented as it is anticipated that the light switch may be activated thousands of times over the life of a light card. As such, this constant bending of the LED lead wire may ultimately cause premature failure of the LED. Similarly, where the main wall of the card also is thinned and constantly bent for switching the light on, there is the possibility that the thinned wall will fail over repeated cycling.

An additional problem with light cards employing LEDs of the type described above is that they typically have to be used along the edge of the card projecting light out from one of the side edges thereof. This is due to their large space requirements relative to the size of the card, and its thickness between the two main faces thereof in particular.

Accordingly, there is a need for a light card having a more durable switching mechanism. Further, a light card having such a durable switching mechanism employed with a light emitted from a face of a light card would be desirable.

SUMMARY OF THE INVENTION

In accordance with the invention, a light card is provided having a switch bar mounted thereto that is operable for providing power to an LED carried by the card. The switch bar is advantageous in that it can be operated independent of the LED and the body of the card. In other words, operation of the switch bar need not require that one of the leads of an LED be bent and/or a portion of the body of the card be deflected for turning the LED light on. Accordingly, the switch bar provides a much more robust switching mechanism as it can be specifically arranged and configured to allow for a user to bend or deflect the bar during switching operations without generating undue fatigue and damage to the LED or potentially the card body itself.

In a preferred form, the light card has a surface mount LED mounted to the card body thereof. The surface mount LED projects light from at least one of the opposite surfaces of the card body. The switch bar does not require bending of a wire lead from the LED to switch the LED on, and the switch bar allows the surface mount LED to be utilized as the surface mount LED lacks lead wires extending therefrom. Instead, the low profile, surface mount LED has electrical contacts or terminals for making electrical connections to the LED.

In one form, the switch bar has opposite ends that are both spaced from the LED contacts. In another form, the switch bar has one end that is fixed relative to the card body and another end that is cantilevered out therefrom to extend over and in spaced relation to a thin power source that is mounted to the card body.

In another aspect, the light card includes an LED and a conductive switch bar that is distinct from the LED. The switch bar has an elongate and substantially thin, flat configuration that extends along the card body and is of flexible, shape-retentive material. The switch bar has one end fixed to the card body with the other end cantilevered from the fixed end. The cantilevered end and thin, flat configuration of the switch bar allows for easy pushing of the switch bar cantilevered end for energizing the LED. In other words, the cantilevered end provides a lever arm for the switch bar so that it requires a fairly low force for bending the switch bar at the cantilevered end thereof. In addition, the flat configuration provides a greater surface area for engagement therewith so that a user is less likely to miss the user engageable portion of the switching mechanism when attempting to turn the light on.

In another aspect, a lighted viewing card is provided which includes a card member and at least one opening in the card member in which a viewing lens is mounted. A surface mount LED is mounted to the card member and projects light from at least one of the opposite surfaces so as to provided illuminated viewing through the lens. A switch bar is mounted to the card member and has a end that is arranged and configured to be pushed toward a thin power source for energizing the LED. In this aspect, the switch bar allows for the surface mount LED to be employed which, in turn, is useful where a viewing lens is carried by the card. In the previously described prior lighted cards lacking a switch bar, the LEDs emit light from one of the side edges of the card and thus would not provide optimum illumination through a viewing lens carried by the card.

BRIEF DESCRIPTION OF THE DRAWINGS

FIG. 5 is a cross-sectional view taken along line 5—5 of FIG. 3 showing the cantilevered end of the switch bar spaced from the disc battery therebelow by an insulator member;

FIG. 6 is a cross-sectional view similar to FIG. 5 showing the switch bar end pushed through an aperture in the insulator member into engagement with the disc battery for energizing the LED;

FIG. 7 is an alternative embodiment with the light card carrying a pair of viewing lenses;

FIG. 8 is a perspective view of another embodiment of the light card having a more compact form than the prior light cards of FIGS. 1–7;

FIG. 9 is an exploded perspective view of the light card of FIG. 8 including substantially similar components to the light card of FIG. 1 but having slightly different configurations and different locations due to the different size thereof;

DETAILED DESCRIPTION OF THE PREFERRED EMBODIMENTS

Figure 1:
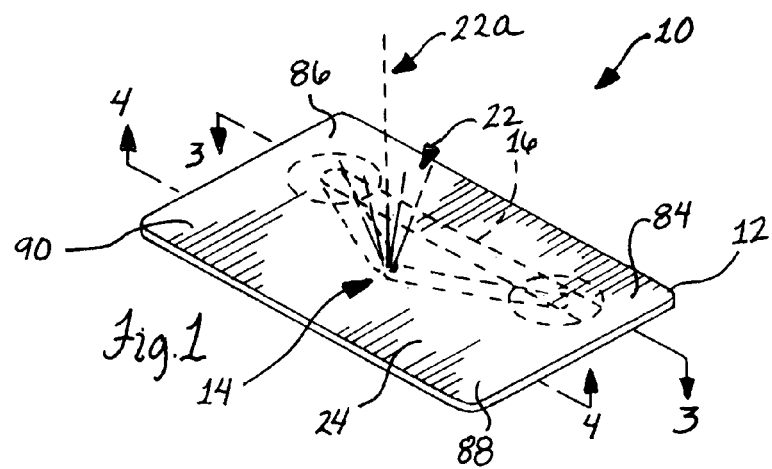
FIG. 1 is a perspective view of a light card in accordance with the present invention showing light being emitted from one of the opposite, main surfaces of the card.
Figure 2:
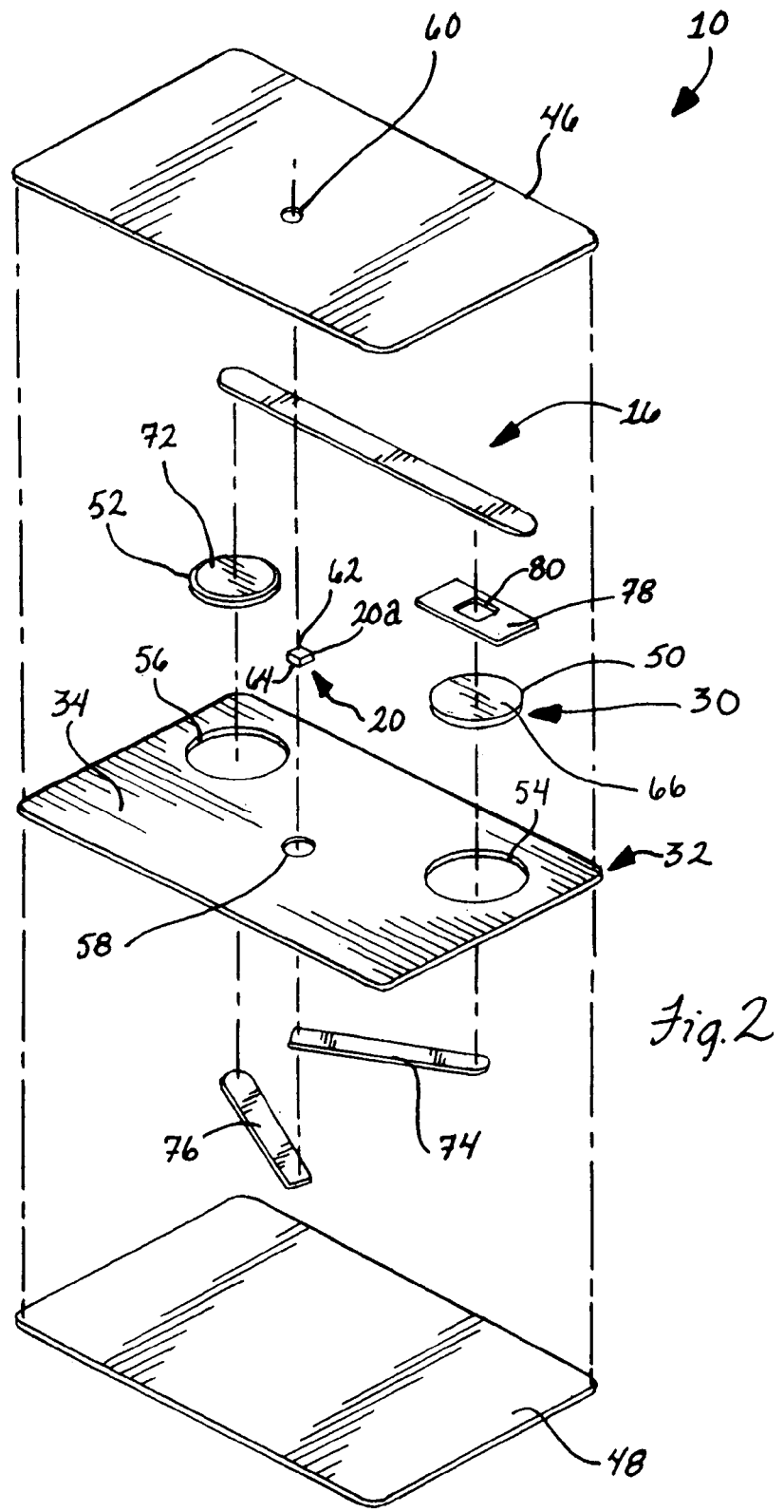
FIG. 2 is an exploded, perspective view of the light card of FIG. 1 showing a thin rigid body to which a switch bar, a pair of disc batteries and a surface mount LED are mounted with upper and lower sheets for being attached to the body.

In FIGS. 1 and 2, a light card 10 is shown including a card member 12 that carries a light source 14 and a switch bar 16 that is operable to energize the light source 14. It is preferred that the switch bar 16 be independent or distinct from the light source 14 so that its operation to perform the switching function thereof does not mechanically affect the components of the light source 14 and thus is solely operable to provide power to or remove power from the light source 14. In addition, the switch bar 16 can be arranged and configured so that it is easy to engage and push the switch bar 16 and in particular end 18 (FIG. 3) thereof for flexing the bar 16 to energize the light source 14. In this regard, it is preferred that the switch bar 16 have an elongate and thin, flat strip configuration and be of a resilient, conductive metallic material. In this manner, the switch bar or strip 16 is designed to be robust and withstand flexing thereof over thousands switching cycles without adversely affecting operation of the present light card 10. The flat configuration of the switch bar 16, and particularly at the integral end 18 thereof provides a surface area that is sufficiently large so that a user can readily push the end 18 for activating the light source 14, and without necessitating additional larger components attached thereto for this purpose such as the additional rectangular conductive member attached to the LED wire lead in the previously discussed '613 patent.

The light card 10 herein is preferably configured with dimensions akin to that of a credit card so that it can be easily carried in a person's pocket, wallet or the like. In addition to the illumination function, the light card 10 can also be implemented on a credit card, debit card or other types of cards which can have raised indicia and/or coded information thereon such as by a magnetic strip. This information typically will relate to the owner of the credit or debit card, for example. The switch bar 16 allows for a use of a low profile light source 14 such as the illustrated surface mount LED 20 as the switch bar 16 does not rely on bending of a wire lead of a more standard, larger LED as in the prior light cards of the '613 and '990 patents. With the surface mount LED, a cone of light 22 can be projected from at least one of the opposite surfaces or faces 24 and 26 of the card member 12. As can be seen from FIGS. 1 and 2, the LED 20 is mounted to emit light from the surface 24. This is in contrast to the larger prior LEDs including the lead wires that generally have to be mounted along one of the edges of the card member.

Another advantage provided by the switch bar 16 is that the end 28 opposite end 18 is fixed relative to the card member 12. Accordingly, with the elongate, strip form of the switch bar 16, the other end 18 of the switch bar 16 is cantilevered from the fixed end 28 out over a thin power source 30 that is mounted to the card member 12. In this manner, the elongate, switch bar 16 provides a lever arm so that it is relatively easy for a user to push the cantilevered end 18 down into electrical contact or engagement with the power source 30 for energizing the LED 20 to generate the light cone 22 therefrom, as will be described more fully hereafter.

Figure 3:
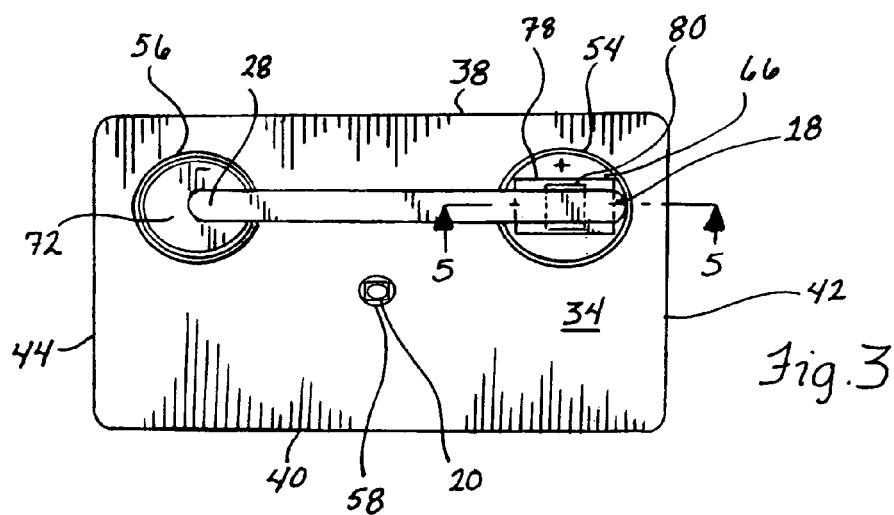
FIG. 3 is a plan view taken along line 3—3 of FIG. 1 showing the elongate light bar having one end fixed to one of the disc batteries and the other end extending over the other disc battery and cantilevered from the fixed end.
Figure 4:
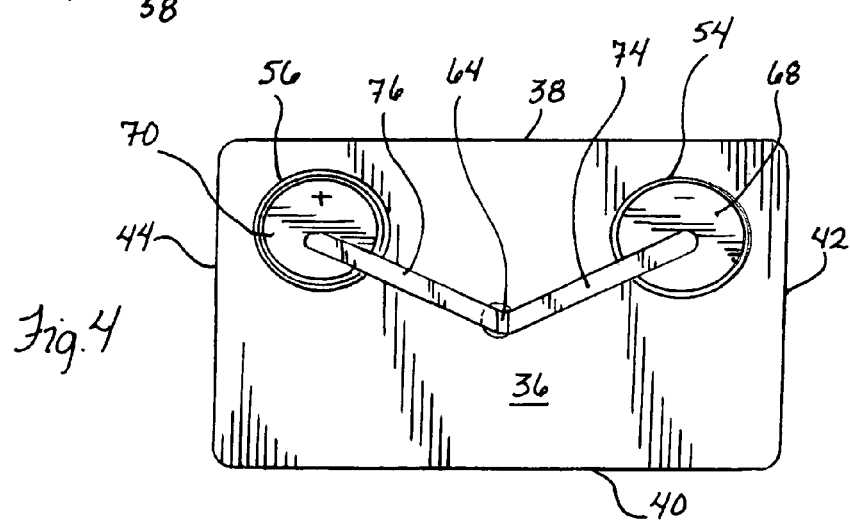
FIG. 4 is a bottom plan view taken along line 4—4 of FIG. 1 show a pair of conductor bars extending from the surface mount LED to the disc batteries.

Turning to more of the details, the card member 12 can have a variety of constructions to provide it with a relatively rigid but somewhat flexible construction, as common with credit and debit cards. As illustrated in FIGS. 2–4, the card member 12 includes a thin card body 32 that can be of generally rigid material, such as plastic. The card body 32 has opposite, main surfaces 34 and 36 corresponding to card member surfaces 24 and 26. The card body 32 has a generally rectangular configuration with a parallel long side edges 38 and 40 that are interconnected by generally parallel short side edges 42 and 44. Similarly configured rectangularly sheets 46 and 48 are attached such as by lamination to the card member body 32 on respective surfaces 34 and 36 thereof. By way of example and not limitation, the long edges 38 and 40 can be approximately 3¼ inches in length, while the short edges can be approximately 2 inches in length.

The thin power source 30 can be in the form of a lithium disc battery 50, and preferably a pair of identical disc batteries 50 and 52, as can be seen best in FIGS. 2–4. The card body 32 has a pair of openings 54 and 56 that extend through to both sides or surfaces 34 and 36 of the card body 32. The through openings 54 and 56 have a diameter slightly larger than the corresponding disc batteries 50 and 52 so that they can fit therein, as can be seen in FIGS. 3 and 4. Similarly, a much smaller through hole or aperture 58 is provided in the card body 32 into which the surface mount LED 20 is fit. The surface mount LED 20 is oriented so that the light cone 22 is projected from the card body surface 34 and thus card member surface 24 formed on the sheet 46. As such, sheet 46 also is provided with a small through aperture 60 that is aligned with aperture 58 and LED 20 therein when attached to the card body 32. On the other hand, backing sheet 48 can have a solid construction.

The surface mount LED 20 has a body 20a having a small, flat, square-chip configuration for fitting in the small aperture 58, as described above. The LED body 20a emits light from its front side 62 and has a pair of electrical contacts formed on the back side 64 thereof. The disc batteries 50 and 52 each include opposite positive and negative conductive surfaces. Accordingly, disc battery 50 has a positive surface 66 and a negative surface 68 that are exposed and accessible on either side of the opening 54 and disc battery 52 has a positive surface 70 and a negative surface 72 that are exposed and accessible on either side of the through opening 56. Referencing FIGS. 2–4, it can be seen that the disc batteries 50 and 52 are arranged oppositely to each other relative to the card body 32. In other words, disc battery 50 has its positive surface 66 accessible along the card body surface 34, whereas disc battery 52 has its negative surface 72 accessible along the card body surface 34, as shown in FIG. 3. On the other hand, disc battery 50 has its negative surface 68 accessible along the card body surface 36, and disc battery 52 has its positive surface 70 accessible along the card body surface 36, as shown in FIG. 4.

Continuing reference to FIG. 4, the LED chip 20a is placed in the aperture 58 so that its back surface 64 including the electrical contacts or conductors formed thereon are accessible in the opening 58 from the card surface 36. A pair of conductive bars 74 and 76 extend from the batteries 50 and 52 to the LED body 20a into electrical contact therewith. Similar to switch bar 16, the conductor bars 74 and 76 can have a substantially flat and low-profile, strip configuration. The conductor bar 74 has one end fixed to the negative surface 68 of the disc battery 50, and its other end fixed to the positive contact formed on the back side 64 of the LED chip body 20a. The conductor bar 76 has one end fixed to the positive surface 70 of the disc battery 52 and its other end is fixed to the negative contact formed on the LED chip body 20a.

Accordingly, to complete the circuit and energize the LED 20, the switch bar 16 needs to be in electrical contact with both the positive surface 66 of battery 50 and the negative surface 72 of battery 52. As shown in FIG. 3, the fixed end 28 of the switch bar 16 is attached to the negative surface 72 of battery 52. On the other hand, the cantilevered end 18 of the switch bar 16 is spaced from the positive surface 66 of the battery 50 so that normally the LED 20 is not energized or provided with power from the batteries 50 and 52. Thus, both ends 18 and 28 of the switch bar 16 are spaced from the electrical contacts of the LED 20. Manifestly, if only one disc battery is employed, then the cantilevered end 18 of the switch bar 16 will be disposed over the single disc battery, and the fixed end 28 will be attached to one of the LED contacts.

To keep the switch bar end 18 spaced from the battery surface 66, an insulator member 78 is disposed between the switch bar end 18 and the battery surface 66, as shown in FIGS. 2, 3 and 5. The member 78 has a thin, substantially flat configuration and is of an insulative material. The insulator member 78 further includes a window opening 80 which allows the flexible bar end 18 to be pushed therethrough. Accordingly, for a user to energize or provide power to the LED 20 to generate light 22, they press on the sheet 46 in the area generally aligned with the switch bar end 18 and insulator member window 80. This pushing force causes the thin, flexible sheet member 46 along with the flexible, cantilevered switch bar end 18 to deflect relative to the more rigid card body 32 and resiliently shift toward the disc battery 50, as shown in FIG. 6. The switch bar end 18 can be moved through the insulator member window 80 into engagement with the battery surface 66 to complete the circuit, thus switching the LED 20 to its on condition and generating light 22 therefrom. The direction of this pushing force to operate the switching mechanism described herein is generally along arrow 82 in a transverse direction to the plane of the card member 12, and more specifically orthogonal to the plane of the card member 12. Once the user desires to switch the LED 20 to its off condition, they remove the pushing force from the card member in the direction 82, and the resiliency of the switch bar 16 will cause its flexible end 18 to return to its original substantially straight configuration, extending along the card body surface 34, as shown in FIGS. 3 and 5.

In the illustrated and preferred form, the LED 20 is disposed approximately centrally in the rectangular card member 12 relative to the card member peripheral edges 38–44, and thus spaced completely inwardly therefrom. In addition, the batteries 50 and 52 are located at corner areas 84 and 86 adjacent the long edge 38 of the card member 12. Thus, the switch bar 16 extends along the card body surface 34 adjacent and parallel to the edge 38, and the conductor bars 74 and 76 extend from the corner areas 84 and 86 along the card body surface 36 obliquely relative to the card edges 38–44 to the center of the card member 12. As can be seen in FIG. 1, the switch bar 16 and conductor bars 74 and 76 have a triangular arrangement.

This arrangement of the components of the light card 10 herein leaves the corner areas 88 and 90 adjacent the card member edge 40 free of such components. The above-described arrangement is particularly well suited where the light card 10 is employed as a viewing card 92, as depicted in FIG. 7. In the viewing card 92, the card member 12 carries a pair of laterally spaced, viewing lenses 94 and 96 that can have an oblong or obround configuration so that they extend into the respective card member corner areas 88 and 90 and extend generally adjacent to and along the card member edge 40. The lenses 88 and 90 are of a refractive material to provide a predetermined viewing correction therewith e.g. diopter rating, and are carried in similarly shaped openings formed in the card member 12 in the corner areas 88 and 90 thereof. An arcuate indent or notch 98 can be formed centrally along the card member edge 40 generally between the lenses 94 and 96. The centrally disposed LED 20 is thus aligned with the notch 98 in an area extending between the laterally spaced lenses 94 and 96. As an alternative to the pair of lenses 94 and 96, a single lens could be employed. For details regarding how the viewing card 92 can carry the lenses 94 and 96 as well as other features that can be implemented in the viewing card 92, reference should be had to applicant's U.S. Pat. No. 6,390,372, which is incorporated by reference as if reproduced in its entirety herein.

The use of a surface mount LED 20 as previously described is particularly useful with the light card 92 as the surface mount LED 20 emits its light cone 22 in the general viewing direction one would have looking though the lenses 94 and 96 of the light card 92. In other words, the surface mount LED 20 is positioned so that its light cone 22 is projected from surface 24 of the card member 12, with light cone axis 22a extending substantially perpendicular to the card member surface 24. In this way, the LED 20 is positioned to maximize the illumination of the viewing area as a user is looking through the lenses 94 and 96. To use the light card 94, a user can grasp the card member 12 at the corner area 84 thereof, and use the notch 98 to rest the light card 92 on the bridge of their nose with the lenses 94 and 96 generally aligned with their eyes and the card surface 26 facing their face. To provide for illuminated viewing through the lenses 94 and 96, the user merely depresses the switch bar end 18 into engagement with the battery 50 by directing a pushing force in direction 82 where indicated on the card member surface 24.

FIGS. 8–13 illustrate an even more compact light card 100 whose dimensions are more suited to use as a key ring holder than a credit and/or debit card similar to light card 10. For the most part, the components in light card 100 and their functional operation are the same as the light card 10 but for their size and configuration to accommodate the smaller space available with card 100, which can have a rectangular configuration of approximately 1.25 inches by 2.75 inches, for example.

Instead of the triangular arrangement of the straight switch bar 16 and straight conductor bars 74 and 76 as in light card 10, the light card 100 has a straight switch bar 106 and a straight conductor bar 176 with the other conductor 174 having a non-linear or bent configuration with several straight segments 174a–d. This is due to the mounting of the disc batteries 150 and 152 and LED 120 in a substantially straight line arrangement along the smaller card member 112. The bent conductor bar 174 extends from the LED 120 to the disc battery 150 while fitting around the disc battery 152, as will be discussed more fully hereinafter.

The surface mount LED 120 is mounted to the card member 112 to emit light from one of the main, opposite surfaces 124 and 126 thereof. As shown in FIG. 8, the LED 120 is mounted to project its light cone 122 from the surface 124. The switch bar 116 has a similar construction to switch bar 16 except it is shorter due to the smaller size of the card member 112. Accordingly, the elongate, strip switch bar 116 has a cantilevered end 118 that extends out over the disc battery 150 from a fixed end 128 that is attached to the disc battery 152.

The card member 112 also has a laminated construction similar to card member 12 including a thin card body 132 having opposite main surfaces 134 and 136 corresponding to card member surfaces 124 and 126. As previously mentioned, the card body 132 has a rectangular configuration with long edges 138 and 140 interconnected with short edges 142 and 144. Similarly configured rectangular sheets 146 and 148 are attached as by lamination to the card member body 132 on respective surfaces 134 and 136 thereof.

The card body 132 has a pair of through openings 154 and 156 sized for fitting the corresponding disc batteries 150 and 152 therein. A small through hole or aperture 158 is provided in the card body 132 into which the surface mount LED 120 is fit. The surface mount LED 120 is oriented so that the light cone 122 is projected from the card body surface 134 and thus card member surface 124 formed on the sheet 146. As such, sheet 146 also is provided with a small through aperture 160 that is aligned with aperture 158 and LED 120 therein when attached to the card body 132.

Figure 10:
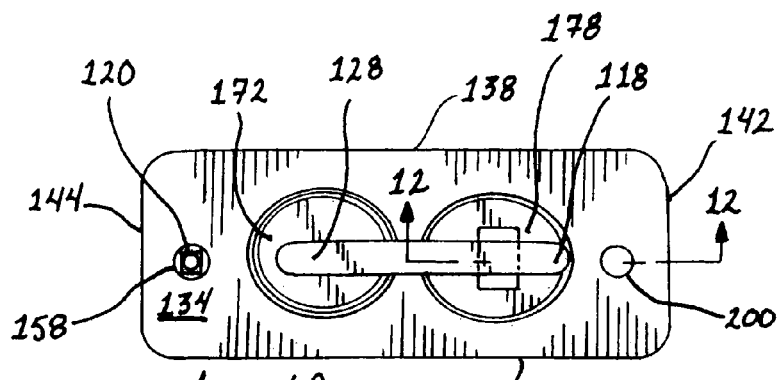
FIG. 10 is a plan view taken along line 10—10 of FIG. 8 showing a switch bar spanning the disc batteries.
Figure 11:
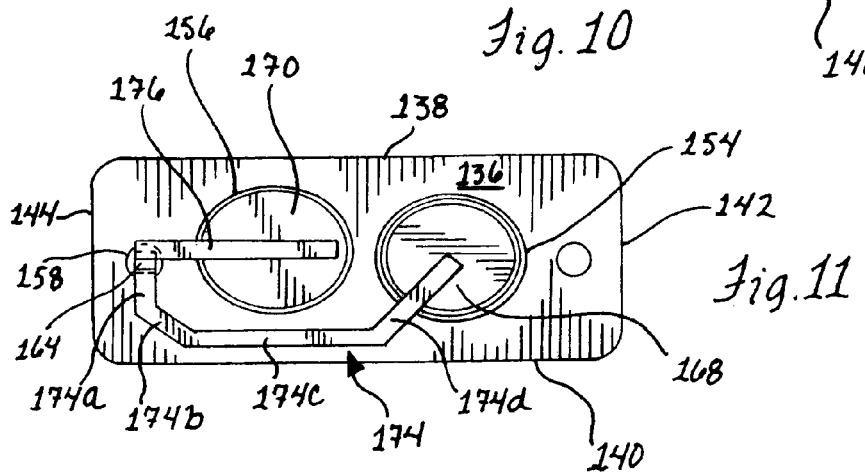
FIG. 11 is a bottom plan view taken along line 11—11 of FIG. 8 showing conductor bars extending from the LED to the disc batteries.

The LED body 120a emits light from its front side 162 and has a pair of electrical contacts formed on the back side 164 thereof. The disc batteries 150 and 152 each include opposite positive and negative conductive surfaces. Accordingly, disc battery 150 has a positive surface 166 and a negative surface 168 that are exposed and accessible on either side of the opening 154 and disc battery 152 has a positive surface 170 and a negative surface 172 that are exposed and accessible on either side of the through opening 156. As with light card 10, the disc batteries 150 and 152 are arranged oppositely to each other relative to the card body 132, as shown in FIGS. 10 and 11. The disc battery 150 has its positive surface 166 accessible along the card body surface 134, whereas disc battery 152 has its negative surface 172 accessible along the card body surface 134, as shown in FIG. 10. On the other hand, disc battery 150 has its negative surface 168 accessible along the card body surface 136, and disc battery 152 has its positive surface 170 accessible along the card body surface 136, as shown in FIG. 11.

Continuing reference to FIG. 11, the LED chip 120a is placed in the aperture 158 so that its back surface 164 including the electrical contacts or conductors formed thereon are accessible in the opening 158 from the card surface 136. As previously discussed, the conductive bars 174 and 176 extend from the batteries 150 and 152 to the LED body 120a into electrical contact therewith. The conductive bar 174 has one end fixed to the negative surface 168 of the disc battery 150, and its other end fixed to the positive contact formed on the backside 164 of the LED chip body 120a. The conductor bar 176 has one end fixed to the positive surface 170 of the disc battery 152 and its other end is fixed to the negative contact formed on the LED chip body 120a.

Referring to FIG. 11, the disc battery openings 154 and 156 are spaced approximately centrally between the long edges 138 and 140 of the card member 112 with opening 154 spaced approximately the same distance from edge 142 as the opening 156 is spaced from the opposite edge 144. The LED opening 158 is arranged in the area of the card body 132 between edge 144 and opening 156. As shown, the openings 154, 156 and 158 have their centers generally aligned with each other with the axis extending through these centers being parallel to the card edges 138 and 140. The conductor bar 176 extends between the LED body 120a and the battery surface 170 in a straight line configuration generally along this same axis. However, due to the larger size of the battery opening 156 versus the LED opening 158, the conductor bar 174 has a non-linear or bent configuration so that it can extend from the LED body 120a in the opening 158 around battery opening 156 and to the battery 150, and specifically the surface 168 thereof located in opening 154. The conductor bar 174 can consist of several linear segments 174a–174d with segment 174a extending adjacent to and parallel to the edge 144, and segment 174c extending adjacent to and parallel to the edge 140. Conductor bar segment 174b extends obliquely to the adjacent edges 140 and 144 and interconnects the bar segments 174a and 174c. Finally, segment 174d extends from the segment 174c obliquely to adjacent edge 140 and into electrical contact with the battery surface 168 at the end thereof.

To complete the circuit and energize the LED 120, the switch bar 116 needs to be in electrical contact with both the positive surface 166 of battery 150 and the negative surface 172 of battery 152. As can be seen in FIG. 10, the fixed end 128 of the switch bar 116 is attached to the negative surface 172 of battery 152. On the other hand, the cantilevered end 118 of the switch bar 116 is spaced from the positive surface 166 of the battery so that normally the LED 120 is not energized or provided with power from the batteries 150 and 152. Thus, both ends 118 and 128 of the switch bar 116 are spaced from the electrical contacts of the LED 120.

Figure 12:
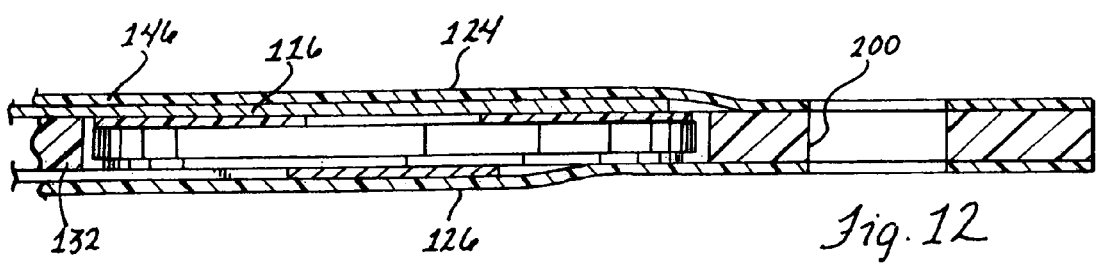
FIG. 12 is a cross-sectional view taken along line 12—12 of FIG. 10 showing the cantilevered end of the switch bar spaced over the disc battery therebelow.
Figure 13:
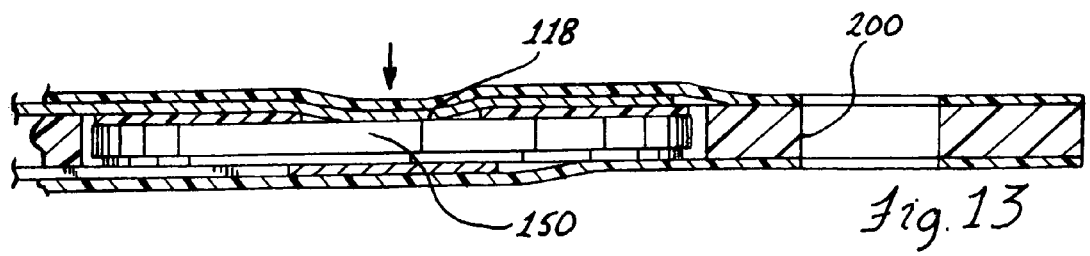
FIG. 13 is a cross-sectional view similar to FIG. 12 showing the cantilevered end pushed through an aperture in the insulator member into engagement with the disc battery for energizing the LED.

To keep the switch bar end 118 spaced from the battery surface 166 and insulator member 178 can be disposed between the switch bar end 118 and the battery surface 166, as shown in FIGS. 9, 10 and 12. The insulator member 178 may differ slightly from insulator member 78 in that it covers the entire battery surface 166 except for the portion exposed in the window 180 thereof. Accordingly, for a user to energize or provide power to the LED 120 to generate light 122, they press on the sheet 146 in the area generally aligned with the switch bar end 118 and insulator member window 180. This pushing force causes the thin, flexible sheet member 146 along with the flexible, cantilevered switch bar end 118 to shift toward the disc battery 150, as shown in FIG. 13.

The reduced size of the light card 100 allows it to be used as a key ring holder, as it can readily fit in a person's pocket as previously mentioned. For this purpose, a through aperture 200 can be punched in the card member 112 in the area between the battery opening 154 and the card edge 142. As can been seen best in FIGS. 10 and 11, this opening 200 can be aligned with the centers of the battery openings 154 and 156, and the LED opening 158. Like the LED opening 158, the through opening 200 is centrally disposed intermediate the edges 138 and 140. A key ring 202 can be inserted to extend through the through opening 200 for use in attaching keys to the light card member 100. Unlike the LED opening 158 which does not extend all the way through the card member 112 as there is no corresponding opening therefor formed in sheet member 148, the key ring opening 200 is a through opening that extends through the full thickness of the card member 112 to open to both main surfaces 124 and 126 thereof, as illustrated in FIGS. 12 and 13. Accordingly, the through opening 200 includes aligned through openings 200a–c formed in the card member body 132 and the sheet members 146 and 148, as shown in FIG. 9.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A light card comprising:
   a thin card body that generally extends in a plane;
   opposite surfaces of the card body;
   a surface mount LED mounted to the card body to project light from at least one of the opposite surfaces thereof;
   electrical contacts of the surface mount LED;
   a thin power source mounted to the card body; and
   a switch bar mounted to the card body operable to be shifted in a direction transverse to the plane of the card body to selectively provide power from the power source to the LED for generating light therefrom.

2. The light card of claim 1 wherein the switch bar is of resilient conductive material.

3. The light card of claim 1 wherein the switch bar has opposite ends that are both spaced from the LED contacts.

4. The light card of claim 1 wherein the switch bar has opposite ends including one end fixed relative to the card body and the other end cantilevered therefrom extending over and spaced from the power source.

5. The light card of claim 4 wherein the fixed end of the switch bar is spaced from the LED contacts.

6. The light card of claim 4 wherein the power source comprises a pair of disc batteries each having positive and negative electrically conductive sides that are arranged oppositely to each other relative to the card body with the fixed end of the switch bar attached to the negative side on one of the disc batteries and the cantilevered end spaced over the positive side of the other disc battery.

7. The light card of claim 1 wherein the switch bar includes an end for being pushed toward the power source and the switch bar end is adjacent the one surface of the card body from which light of the LED is projected.

8. The light card of claim 7 including an insulator member between the switch bar end and the power source with the insulator member including an opening into which the switch bar end is pushed to energize the LED.

9. The light card of claim 1 wherein the card body has peripheral edges and the surface mount LED is spaced from the card body edges.

10. The light card of claim 1 wherein the card body includes at least one opening, and a lens in the opening for providing enhanced viewing therethrough.

11. The light card of claim 10 wherein the at least one opening comprises a pair of laterally spaced openings, the lens comprises a pair of lenses with one lens in each opening, and the LED is aligned with an area generally between the spaced lenses to provide illuminated viewing through the lenses.

12. A light card comprising:
    a thin card body of generally rigid material;
    an LED mounted to the card body;
    a thin power source mounted to the card body;
    a conductive switch bar distinct from the LED and the card body, the conductive switch bar having an elongate and substantially thin, flat configuration extending along the card body and being of flexible, shape-retentive material; and
    opposite ends of the switch bar with one end fixed relative to the card body and the other end cantilevered from the fixed end with the cantilevered end and flat configuration of the switch bar permitting ease in pushing of the switch bar cantilevered end for energizing the LED with power from the power source.

13. The light card of claim 12 wherein the LED includes electrical conductors that remain fixed as the switch bar cantilevered end is pushed.

14. The light card of claim 12 wherein the LED is a surface mount LED including electrical contacts spaced from the cantilevered end of the switch bar.

15. The light card of claim 12 wherein the card body includes opposite surfaces and the surface mount LED projects a cone of light having an axis that extends transverse to at least one of the card body surfaces.

16. The light card of claim 12 wherein the thin power source comprises a pair of disc batteries, and
    a pair of elongate and flat conductor bars mounted to the card body with each conductor bar extending from the LED to one of the pair of disc batteries.

* * * * *